United States Patent
Seo et al.

(10) Patent No.: US 9,405,349 B2
(45) Date of Patent: Aug. 2, 2016

(54) MULTI-CORE APPARATUS AND JOB SCHEDULING METHOD THEREOF

(71) Applicants: Samsung Electronics Co., Ltd., Suwon-si (KR); Korea Advanced Institute of Science and Technology, Daejeon-si (KR)

(72) Inventors: Woong Seo, Hwaseong-si (KR); Yeon-Gon Cho, Hwaseong-si (KR); Soo-Jung Ryu, Hwaseong-si (KR); Seok-Woo Song, Daejeon-si (KR); John Dongjun Kim, Daejeon-si (KR); Min-Seok Lee, Daejeon-si (KR)

(73) Assignees: Samsung Electronics Co., Ltd., Suwon-si (KR); Korea Advanced Institute of Science and Technology, Daejeon-si (KR)

( * ) Notice: Subject to any disclaimer, the term of this patent is extended or adjusted under 35 U.S.C. 154(b) by 188 days.

(21) Appl. No.: 14/287,515

(22) Filed: May 27, 2014

(65) Prior Publication Data
US 2014/0359335 A1 Dec. 4, 2014

(30) Foreign Application Priority Data

May 30, 2013 (KR) .......................... 10-2013-0062011

(51) Int. Cl.
*G06F 1/26* (2006.01)
*G06F 9/00* (2006.01)
(Continued)

(52) U.S. Cl.
CPC .............. *G06F 1/3234* (2013.01); *G06F 1/329* (2013.01); *G06F 1/3287* (2013.01); *G06F 9/4893* (2013.01); *Y02B 60/1282* (2013.01); *Y02B 60/144* (2013.01)

(58) Field of Classification Search
CPC ......... G06F 1/329; G06F 1/3228; G06F 1/32; G06F 1/3009; G06F 1/3836; Y02B 60/144
See application file for complete search history.

(56) References Cited

U.S. PATENT DOCUMENTS

| 8,108,863 | B2 | 1/2012 | Rakvic et al. |
| 8,429,441 | B2 * | 4/2013 | Baker ................... G06F 1/3203 712/32 |
| 8,443,209 | B2 | 5/2013 | Nussbaum et al. |

(Continued)

FOREIGN PATENT DOCUMENTS

| JP | 2010-271930 A | 12/2010 |
| JP | 2011-515776 A | 5/2011 |

(Continued)

OTHER PUBLICATIONS

Hong, Sunpyo, et al. "An integrated GPU power and performance model." ISCA '10. ACM, 2010 (10 pages, in English).

(Continued)

*Primary Examiner* — Mark Connolly
*Assistant Examiner* — Kevin Stewart
(74) *Attorney, Agent, or Firm* — NSIP Law (57) ABSTRACT

A multi-core apparatus includes cores each including an active cycle counting unit configured to store an active cycle count, and a stall cycle counting unit configured to store a stall cycle count. The multi-core apparatus further includes a job scheduler configured to determine an optimal number of cores in an active state based on state information received from each of the cores, and adjust power to maintain the optimal number of cores.

21 Claims, 8 Drawing Sheets

(51) Int. Cl.
*G06F 1/32* (2006.01)
*G06F 9/48* (2006.01)

(56) References Cited

U.S. PATENT DOCUMENTS

| | | | |
|---|---|---|---|
| 2005/0050310 A1* | 3/2005 | Bailey | G06F 1/324 713/1 |
| 2008/0263324 A1* | 10/2008 | Sutardja | G06F 1/3203 712/43 |
| 2009/0210740 A1 | 8/2009 | Huang et al. | |
| 2009/0249094 A1 | 10/2009 | Marshall et al. | |
| 2010/0299541 A1 | 11/2010 | Ishikawa et al. | |
| 2011/0022876 A1 | 1/2011 | Sasaki | |
| 2011/0154321 A1 | 6/2011 | Tian et al. | |
| 2011/0185203 A1* | 7/2011 | Carlson | G06F 1/32 713/320 |
| 2011/0213998 A1 | 9/2011 | Mathieson et al. | |
| 2011/0219382 A1* | 9/2011 | Hou | G06F 9/50 718/104 |
| 2011/0307730 A1 | 12/2011 | Marshall et al. | |
| 2012/0079235 A1* | 3/2012 | Iyer | G06F 9/5027 712/30 |
| 2012/0159496 A1* | 6/2012 | Dighe | G06F 9/4893 718/102 |

FOREIGN PATENT DOCUMENTS

| | | |
|---|---|---|
| KR | 10-2011-0073714 A | 6/2011 |
| WO | WO 2009/125789 A1 | 10/2009 |

OTHER PUBLICATIONS

Lee, Jungseob, et al. "Improving throughput of power-constrained GPUs using dynamic voltage/frequency and core scaling." 2011 International Conference on Parallel Architectures and Compilation Techniques (PACT). IEEE, (2011): 111-120.

Extended European Search Report issued in counterpart European Application No. 14169487.7 on May 2, 2016 (8 pages in English).

* cited by examiner

MULTI-CORE APPARATUS AND JOB SCHEDULING METHOD THEREOF

CROSS-REFERENCE TO RELATED APPLICATION

This application claims the benefit under 35 USC 119(a) of Korean Patent Application No. 10-2013-0062011, filed on May 30, 2013, in the Korean Intellectual Property Office, the entire disclosure of which is incorporated herein by reference for all purposes.

BACKGROUND

1. Field

The following description relates to a multi-core apparatus and a job scheduling method thereof.

2. Description of Related Art

An application of a multi-core system, particularly, an application of general purpose computing on graphics processing units (GPGPU), enables an easy parallel processing of a large amount of data, since there is no dependency between the data to be processed. Performance of such parallel processing of a large amount of data may be improved by making the most of resources.

In a general multi-core system, such as a conventional GPU, a job scheduler assigns a maximum number of jobs to each core by a round-robin method, and assigns new jobs again every time jobs processed by the cores are completed one by one, to make sure that the maximum number of jobs is processed all the time. In the case of a computation-intensive workload that mainly uses independent resources, for example, a register file, a shared memory, and a computing unit, as a number of jobs increases, an effect of hiding memory access latency or pipeline latency is enhanced, thereby improving overall performance.

However, in the case of a memory-intensive workload that mainly uses a memory shared by all cores, overall performance cannot be expected to be improved due to a maximum bandwidth limit of a network and a memory, even though a number of jobs is increased. Further, due to network congestion caused by excessive traffic, and insufficiency of Level-2 (L2) cache capacity, performance may be rather degraded in some cases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a multi-core apparatus including cores each including an active cycle counting unit configured to store an active cycle count, and a stall cycle counting unit configured to store a stall cycle count. The multi-core apparatus further includes a job scheduler configured to determine an optimal number of cores in an active state based on state information received from each of the cores, and adjust power to maintain the optimal number of cores.

Each of the cores may further include a front end unit configured to transmit instructions to an execution unit, calculate the active cycle count, and store the active cycle count in the active cycle counting unit, in response to the instructions being transmitted to the execution unit, and calculate the stall cycle count, and store the stall cycle count in the stall cycle counting unit, in response to the instructions not being transmitted to the execution unit.

Each of the cores may further include a state monitoring unit configured to store the state information. The front end unit may be further configured to generate the state information based on the active cycle count and the stall cycle count, and store the state information in the state monitoring unit.

The front end unit may be configured to generate the state information that indicates to change a respective one of the cores into a throttle state in response to the stall cycle count being greater than the active cycle count and a predetermined threshold.

The job scheduler may be configured to change one or more of the cores into a throttle state based on the state information, and determine the optimal number of cores based on a result of the change.

The job scheduler may be configured to determine a number of cores in the active state, which remain after the change, as the optimal number of cores, in response to a current cycle being greater than a predetermined cycle.

The job scheduler may be configured to determine a number of cores in the active state as the optimal number of cores, in response to a current cycle being less than or equal to a predetermined cycle, and the number of cores in the active state being equal to a number of memory channels.

The job scheduler may be configured to change a core in the active state and that completely processes jobs, among the cores, into an OFF state, in response to there being a core in a throttle state, among the cores, and power-gate the core in the OFF state.

The job scheduler may be configured to change the core in the throttle state into the active state in response to the change of the core in the active state into the OFF state, to maintain the optimal number of cores.

The job scheduler may be configured to maintain a core in the active state and that completely processes jobs, among the cores, and assign new jobs to the core in the active state, in response to there not being a core in a throttle state, among the cores.

In another general aspect, there is provided a job scheduling method of a multi-core apparatus, including changing one or more of cores into a throttle state based on state information received from each of the cores, determining an optimal number of cores in an active state based on a result of the changing, and adjusting power to maintain the optimal number of cores based on a result of job processing of cores in the active state.

The changing of the one or more of the cores may include determining whether the state information indicates to change a respective one of the cores into the throttle state, and changing the respective one of the cores into the throttle state in response to the state information being determined to indicate to change the respective one of the cores into the throttle state.

The state information may be generated based on an active cycle count and a stall cycle count of a respective one of the cores.

The determining of the optimal number of cores may include determining whether a current cycle is greater than a predetermined cycle, and determining a number of cores in the active state as the optimal number of cores in response to the current cycle being determined to be greater than the predetermined cycle.

The determining of the optimal number of cores may include determining whether the number of cores in the active state is equal to a number of memory channels in response to the current cycle being determined to be not greater than the predetermined cycle, and determining the number of cores in the active state as the optimal number of cores in response to the number of cores in the active state being determined to be equal to the number of memory channels.

The adjusting of power may include changing a core in an active state and that completely processes jobs, among the cores, into an OFF state, in response to there being the one or more of the cores in the throttle state, and power-gating the core in the OFF state.

The adjusting of power may include changing a core in the throttle state, among the cores, into the active state, in response to the changing of the core in the active state into the OFF state, to maintain the optimal number of cores.

The adjusting of power may include maintaining a core in the active state and that completely processes jobs, among the cores, and assigning new jobs to the core in the active state, in response to there not being the one or more of the cores in the throttle state.

In still another general aspect, there is provided an apparatus including a processor configured to change one or more of cores into a throttle state based on state information received from each of the cores, and turning off a core in an active state and that completely processes a job, among the cores, in response to the change. The processor is further configured to change a core in the throttle state, among the cores, into the active state, in response to the turning off.

The throttle state may be where a respective one of the cores is assigned a job, but is not able to process the job, and an active state may be where a respective one of the cores is assigned a job, and is able to process the job.

The state information that indicates to change a respective one of the cores into the throttle state may be generated in response to a stall cycle count being greater than an active cycle count and a predetermined threshold of the respective one of the cores.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
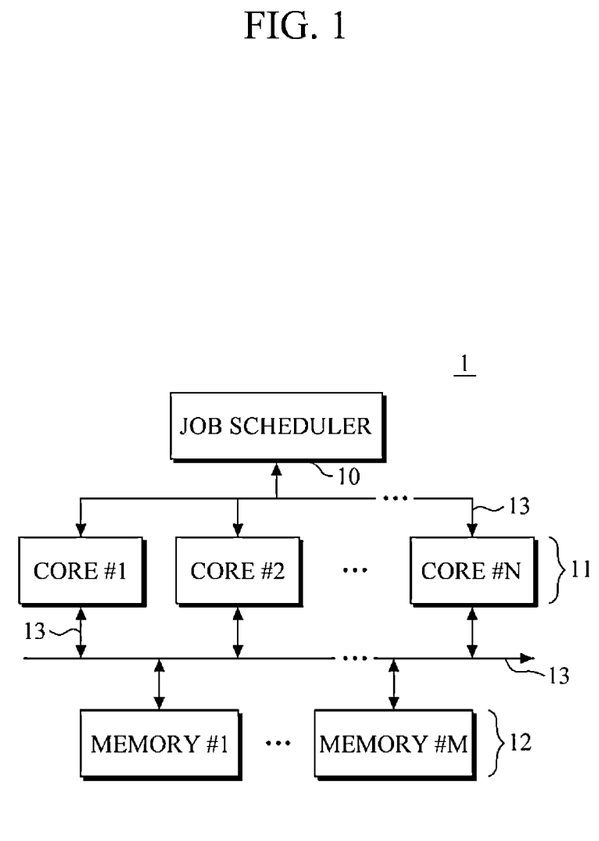
FIG. 1 is a block diagram illustrating an example of a multi-core apparatus.

FIG. 1 is a block diagram illustrating an example of a multi-core apparatus 1. Referring to FIG. 1, the multi-core apparatus 1 includes a job scheduler 10, two or more cores 11, one or more memories 12, and a network 13 that connects the job scheduler 10, the two or more cores 11, and the one or more memories 12.

The job scheduler 10 distributes one or more jobs to each of the cores 11 according to a state of resources of each of the cores 11, which constitute a multi-core. Each of the jobs refers to a bundle of a plurality of data, which are batch-processed in a respective one of the cores 11. The job scheduler 10 assigns a maximum number of the jobs to be processed by each of the cores 11 in consideration of the state of resources of each of the cores 11, for example, a state of a register file and a state of a shared memory. The job scheduler 10 enables a lowest possible energy consumption of the multi-core apparatus 1 by power-gating the cores 11, which have completed all of the jobs assigned.

The cores 11 process one or more of the jobs assigned. Each of the cores 11 includes a register file and a small-sized cache (a private cache), or a memory (a scratchpad memory), so that the jobs are managed by being divided into units, which enable the jobs to be processed at the same time in one cycle.

The memories 12 store input and output data needed between the cores 11 and the job scheduler 10, and are shared by all of the cores 11.

The network 13 connects the job scheduler 10, the cores 11, and the memories 12, and is a transmission path of data and control signals.

Figure 2:
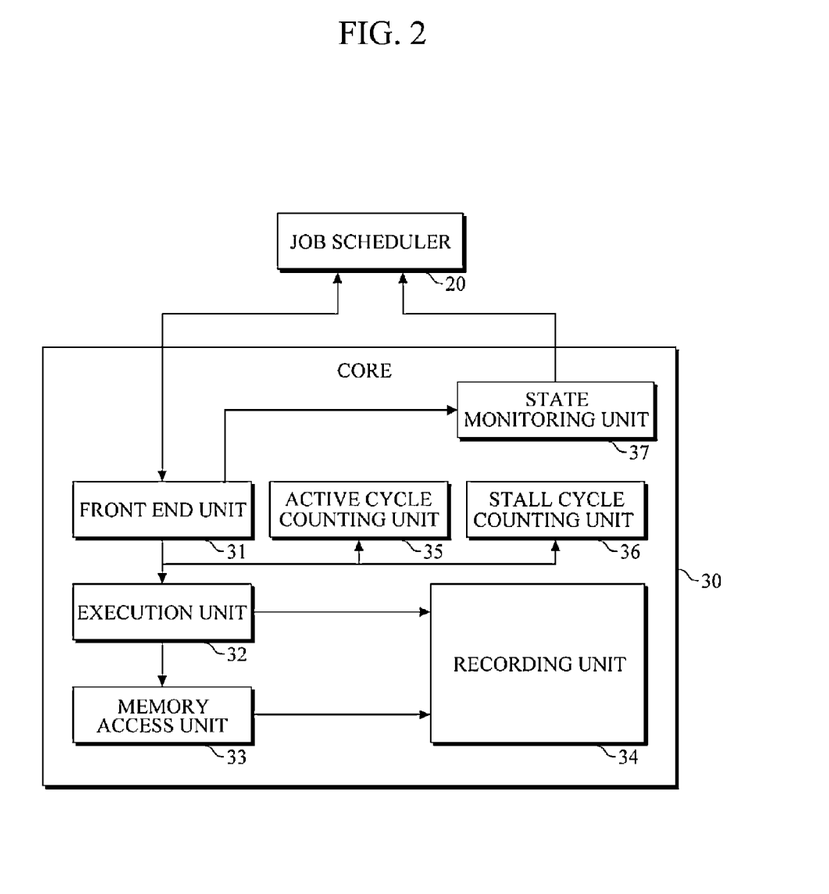
FIG. 2 is a block diagram illustrating a detailed example of a core in a multi-core apparatus.

FIG. 2 is a block diagram illustrating a detailed example of a core 30 in a multi-core apparatus. Referring to FIG. 2, the core 30 includes a front end unit 31, an execution unit 32, a memory access unit 33, and a recording unit 34. Further, the core 30 includes an active cycle counting unit 35, a stall cycle counting unit 36, and a state monitoring unit 37.

The front end unit 31 fetches instructions of a job assigned by a job scheduler 20 from a memory (not shown) or a cache (not shown), and transmits the instructions to the execution unit 32. Before the transmission of the instructions, the front end unit 31 checks a dependency between the instructions, and does not transmit the instructions to the execution unit 32 in a cycle, when the dependency is not resolved in that cycle. Further, the front end unit 31 may hold off the transmission of the instructions if system resources are insufficient.

A stall condition is a condition in which the front end unit 31 does not transmit valid instructions to the execution unit 32, and a cycle in which the stall condition occurs is a stall cycle. By contrast, an active condition is a condition in which the front end unit 31 transmits valid instructions to the execution unit 32, and a cycle in which the active condition occurs is an active cycle.

The execution unit 32 processes data or instructions input from the front end unit 31 according to a type of the instructions.

The memory access unit 33 reads data from a memory, or records data in a memory.

The recording unit 34 records, in a register file (not shown) of the core 30, data that is processed in the execution unit 32, or data that is read from the memory by the memory access unit 33.

When transmitting instructions to the execution unit 32, the front end unit 31 calculates or increments an active cycle count, and stores the active cycle count in the active cycle counting unit 35, in response to an occurrence of an active condition. The front end unit 31 calculates or increments a stall cycle count, and stores the stall cycle count in the stall cycle counting unit 36, in response to an occurrence of a stall condition due to, for example, latency caused by memory access instructions.

Further, the front end unit 31 generates state information, which indicates whether to change a state of the core 30 from an active state to a throttle state, based on the active cycle count and the stall cycle count, and stores the state information in the state monitoring unit 37, which informs the job scheduler 20 of the state information. For example, after comparing the stall cycle count with the active cycle count and a predetermined threshold, when the stall cycle count is greater than both the active cycle count and the predetermined threshold, the front end unit 31 generates the state information that indicates to change the state of the core 30 into the throttle state.

The core 30 may have an active state, a throttle state, or an OFF state, which is determined by the job scheduler 20. The active state refers to a state where jobs are assigned to the core 30 by the job scheduler 20, and instructions may be transmitted to the execution unit 32. The throttle state refers to a state where there are jobs assigned to the core 30, but instructions may not be transmitted to the execution unit 32. Further, the OFF state refers to a state where all jobs assigned to the core 30 are completed, with no more jobs newly-assigned, and power-gating is performed. At an end of a program sequence, the front end unit 31 generates state information indicating to change the state of the core 30 to the OFF state, and stores the state information in the state monitoring unit 37, which informs the job scheduler 20 of the state information.

Figure 3:
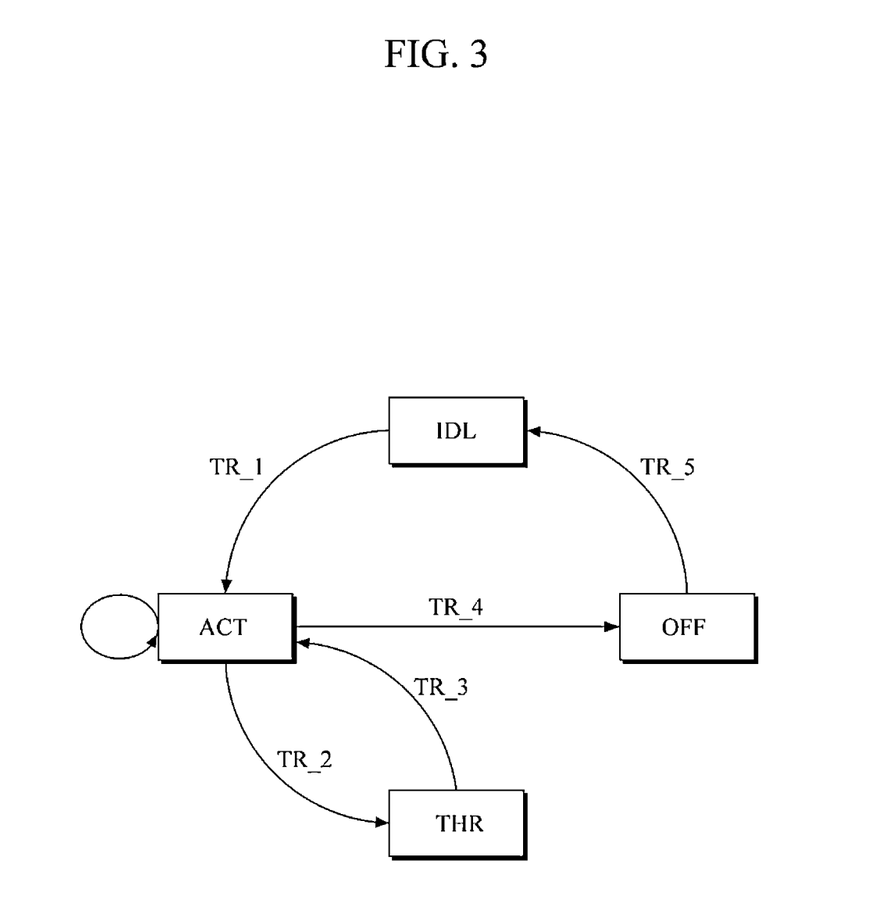
FIG. 3 is a diagram illustrating an example of changing a state of a core in a multi-core apparatus.

FIG. 3 is a diagram illustrating an example of changing a state of a core in a multi-core apparatus. Changing a state of the core 30 by the job scheduler 20 will be described with reference to FIGS. 2 and 3.

In an idle state IDL where no jobs are assigned to all cores constituting the multi-core apparatus, the job scheduler 20 assigns one or more jobs to the core 30, and changes the state of the core 30 into an active state ACT (TR_1). Further, when state information that indicates to change the state of the core 30 into a throttle state THR is generated by the front end unit 31, the state of the core 30 is changed into the throttle state THR (TR_2). When the state of the core 30 is not changed into the throttle state THR, and all of the jobs assigned are completed, the state of the core 30 is changed into an OFF state (TR_4), and power-gating is performed. When the state of the core 30 is changed into the throttle state THR (TR_2), and then a state of another core in an active state is changed into an OFF state, the state of the core 30 is changed again into the active state ACT (TR_3) to process assigned jobs. When each of the cores constituting the multi-core apparatus is changed into the OFF state, each of the cores is changed again into the idle state IDL (TR_5).

Referring to FIG. 1 again, as described above, the job scheduler 10 changes a state of each of the cores 11, which has state information that indicates to change into a throttle state, into the throttle state step by step at every cycle, such that an optimal number of cores in an active state may be determined to enable the multi-core apparatus 1 to have a lowest possible energy consumption. In detail, after comparing a current cycle with a predetermined monitoring cycle, in response to the current cycle being greater than the predetermined monitoring cycle, the job scheduler 10 determines a number of active-state cores, among the cores 11, which remain in the current cycle and the active state without being changed into the throttle state, as the optimal number of active-state cores. In response to the current cycle not being greater than the predetermined monitoring cycle, the job scheduler 10 determines a number of the active-state cores as the optimal number of active-state cores, in an example where the number of the active-state cores in the current cycle is the same as a number of channels of a memory (e.g., dynamic random-access memory (DRAM)) when compared.

Thereafter, the number of the active-state cores that is the optimal number of active-state cores determined at every cycle is maintained in the active state to allow the active-state cores to process jobs. Further, a rest of the cores 11 wait in the throttle state, or are cores that have completed the processing of the jobs, and are changed into an OFF state by power-gating the cores.

As a result, energy consumption of the multi-core apparatus 1 may be minimized. That is, the number of the active-state cores that is the optimal number of active-state cores determined for optimal performance are maintained in the active state to consume dynamic power and static power, the cores in the throttle state consume only static power, and the cores that have completed all of the jobs and are in the OFF state consume neither static power nor dynamic power by power-gating the cores, thereby minimizing energy consumption.

In response to there being throttle-state cores in a current cycle, the job scheduler 10 waits for cores currently in an active state to complete jobs. When a core, among the cores currently in the active state, has completed jobs, a state of the core is changed into an OFF state, power to the core is turned OFF, and power-gating is performed so the core does not consume dynamic power and static power. Further, the throttle-state cores are changed into the active state to process jobs, so that an optimal number of active-state cores are continuously maintained. In response to no throttle-state cores being in a current cycle, even though the cores currently in the active state complete jobs, the job scheduler 10 does not turn power to any of the active-state cores OFF, keeps the active-state cores in the active state to maintain the optimal number of active-state cores, and may newly assign remaining jobs to be processed to the active-state cores.

Figure 4:
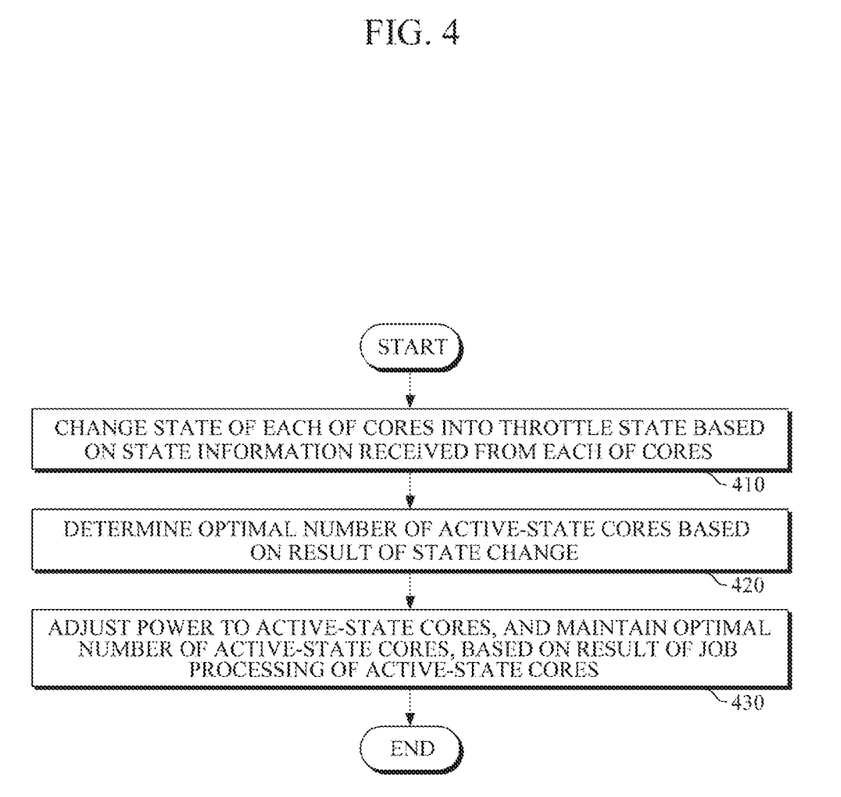
FIG. 4 is a flowchart illustrating an example of a method of job scheduling of a multi-core apparatus.

FIG. 4 is a flowchart illustrating an example of a method of job scheduling of a multi-core apparatus. FIG. 4 is an example of the job scheduling method, which may be performed by the job scheduler 10 in the multi-core apparatus 1 according to the example of FIG. 1.

Referring to FIG. 4, in operation 410, the job scheduler changes a state of each of one or more cores into a throttle state based on state information received from each of the cores, which constitute a multi-core apparatus. The job scheduler may change the state of each of the cores into the throttle state step by step at every cycle until an optimal number of cores in an active state are determined.

In operation 420, the job scheduler determines the optimal number of active-state cores based on a result of the state change that minimizes energy consumption of the multi-core apparatus.

In operation 430, the job scheduler adjusts power to one or more cores currently in the active state, and maintains the optimal number of active-state cores, based on a result of job processing of the active-state cores. As described above, the job scheduler changes a state of each of the active-state cores, which have completed jobs, into an OFF state, performs power-gating of the OFF-state cores, and changes a state of one or more of the throttle-state cores into the active state to process jobs so that the determined optimal number of active-state cores is continuously maintained.

Figure 5:
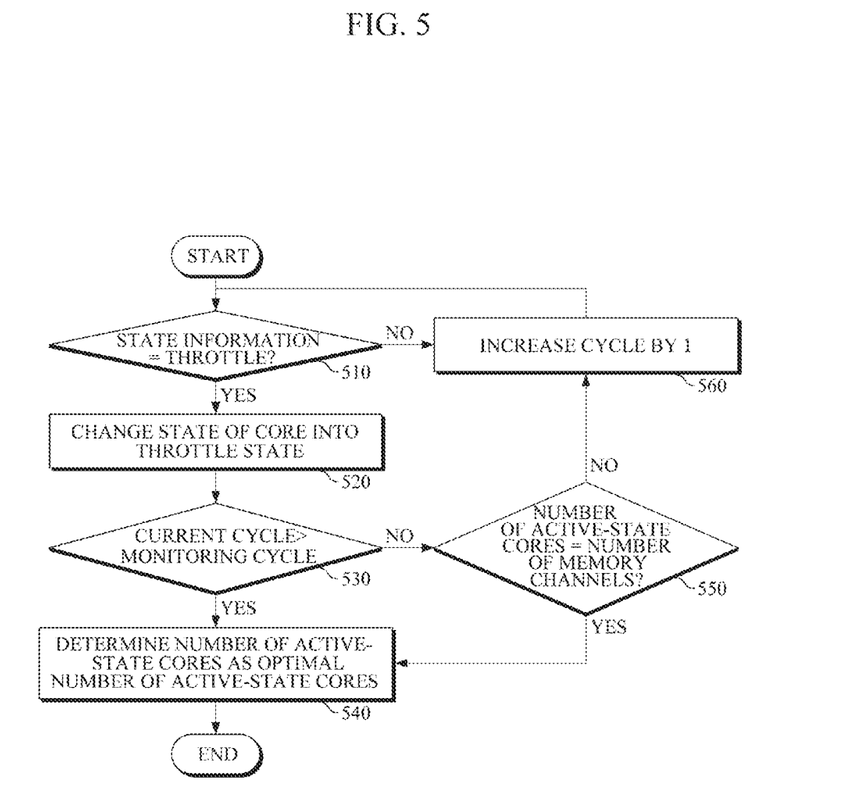
FIG. 5 is a flowchart illustrating an example of a method of changing a state of each of cores and determining an optimal number of active-state cores in an example of a method of job scheduling.

FIG. 5 is a flowchart illustrating an example of a method of changing a state of each of cores and determining an optimal number of active-state cores in an example of a method of job scheduling. The method of changing the state of each of the cores and determining the optimal number of active-state cores is performed by a job scheduler, e.g., the job scheduler 10 of FIG. 1.

In operation 510, the job scheduler determines whether state information received from a core, among the cores, refers to changing a state of the core into a throttle state. If the state information is determined to refer to changing the state of the core into the throttle state, the job scheduler continues in operation 520. Otherwise, the job scheduler continues in operation 560.

In operation 520, the job scheduler changes the state of the core into the throttle state.

In operation 530, the job scheduler determines whether a current cycle is greater than a predetermined monitoring cycle. If the current cycle is determined to be greater than the predetermined monitoring cycle, the job scheduler continues in operation 540. Otherwise, the job scheduler continues in operation 550.

In operation 540, the job scheduler determines a number of cores currently in an active state without being changed into the throttle state, as the optimal number of active-state cores.

In operation 550, the job scheduler determines whether the number of cores currently in the active state is the same as a number of channels of a memory (e.g. DRAM). If the number of cores currently in the active state is determined to be same as the number of channels of the memory, the job scheduler continues in operation 540. Otherwise, the job scheduler continues in operation 560.

In operation 560, the job scheduler increases the current cycle by 1, and a next cycle proceeds. When the optimal number of active-state cores is determined, the job scheduler proceeds to the next cycle to process jobs through the number of cores currently in the active state that is determined as the optimal number of active-state cores.

Figure 6:
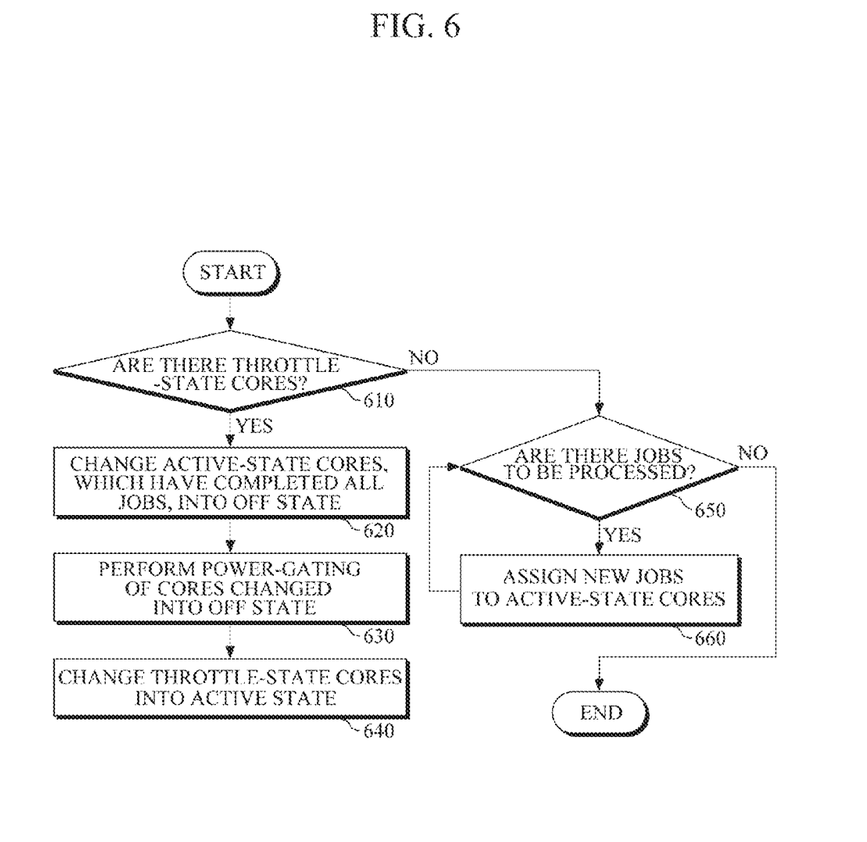
FIG. 6 is a flowchart illustrating an example of a method of adjusting power in an example of a method of job scheduling.

FIG. 6 is a flowchart illustrating an example of a method of adjusting power in an example of a method of job scheduling. The method of adjusting the power to one or more cores is performed by a job scheduler, e.g., the job scheduler of FIG. 1.

In operation 610, the job scheduler determines whether there are one or more throttle-state cores in a current cycle. When there are determined to be throttle-state cores in the current cycle, the job scheduler continues in operation 620. Otherwise, the job scheduler continues in operation 650.

In operation 620, the job scheduler waits until any one of cores currently in an active state completes all jobs assigned, changes a state of each of the active-state cores, which have completed all respective jobs assigned, into an OFF state.

In operation 630, the job scheduler performs power-gating of the cores changed into the OFF state.

In operation 640, the job scheduler changes a number of the throttle-state cores into the active state to process jobs, so as to maintain an optimal number of active-state cores.

In operation 650, the job scheduler determines whether there are jobs to be processed. When there are determined to be no jobs to be processed, the method is terminated. Otherwise, the job scheduler continues in operation 660.

In operation 660, the job scheduler maintains the active-state cores even though the active-state cores have completed all of the respective jobs assigned, and assigns new jobs to be processed to the active-state cores. The job scheduler returns to operation 650.

Figure 7:
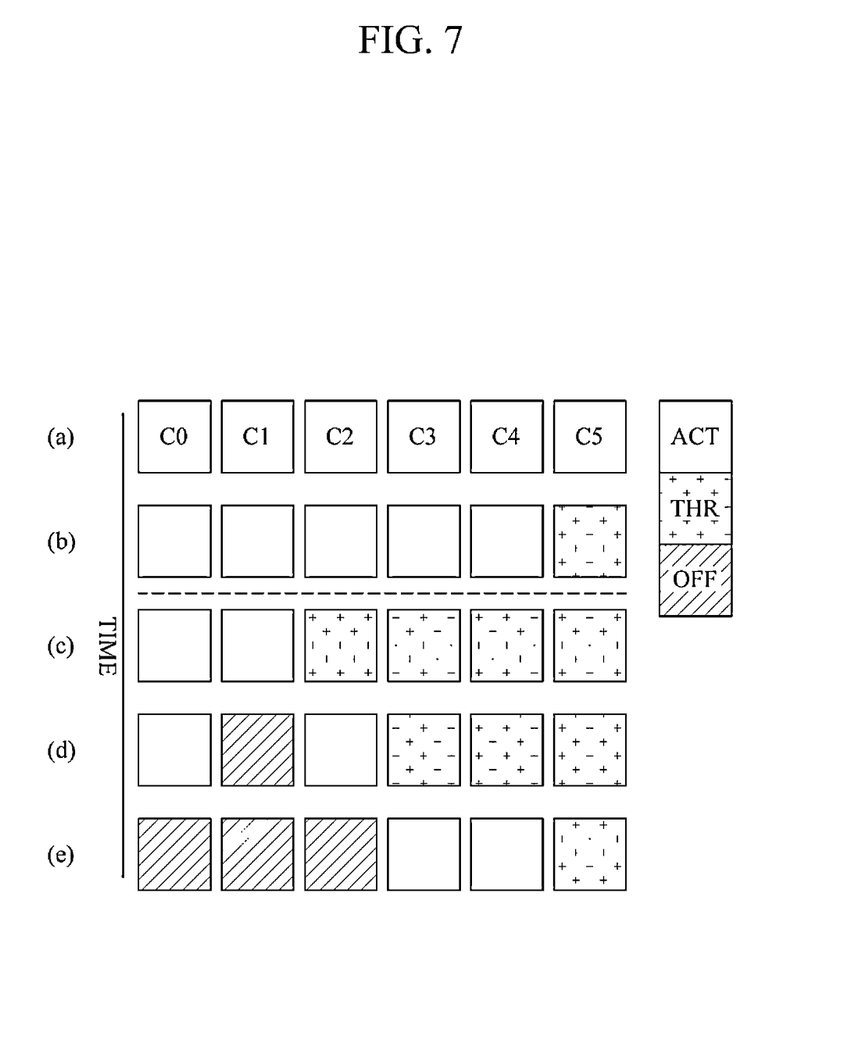
FIG. 7 is a diagram illustrating an example of changing a state of each of cores and power-gating in a multi-core apparatus.

FIG. 7 is a diagram illustrating an example of changing a state of each of cores and power-gating in a multi-core apparatus. The multi-core apparatus is comprised of five cores C0-C5, and in portion (a), jobs are assigned to all of the cores C0-C5, thereby being in an active state ACT. Subsequently, in portion (b), a state of the core C5 is changed into a throttle state THR, and thereafter, states of cores are changed step by step until an optimal number of active-state cores is determined. In portion (c), a state of each of the cores C2, C3, and C4 is changed into the throttle state, while a state of each of the cores C0 and C1 remain in the active state, and as a result, it is determined that the optimal number of active-state cores is 2. Then, in portion (d), all of the jobs of the core C1 are completed, such that the state of the core C1 is changed into an OFF state where power of the core C1 is turned off, and the state of the core C2 is changed from the throttle state into the active state to process jobs. Thereafter, in portion (e), all of the jobs of the cores C0 and C2 are completed, such that the state of each of the cores C0 and C2 is changed into the OFF state where power of the core C0 or C2 is turned off, and the state of each of the cores C3 and C4 is changed from the throttle state into the active state to process jobs.

Figure 8:
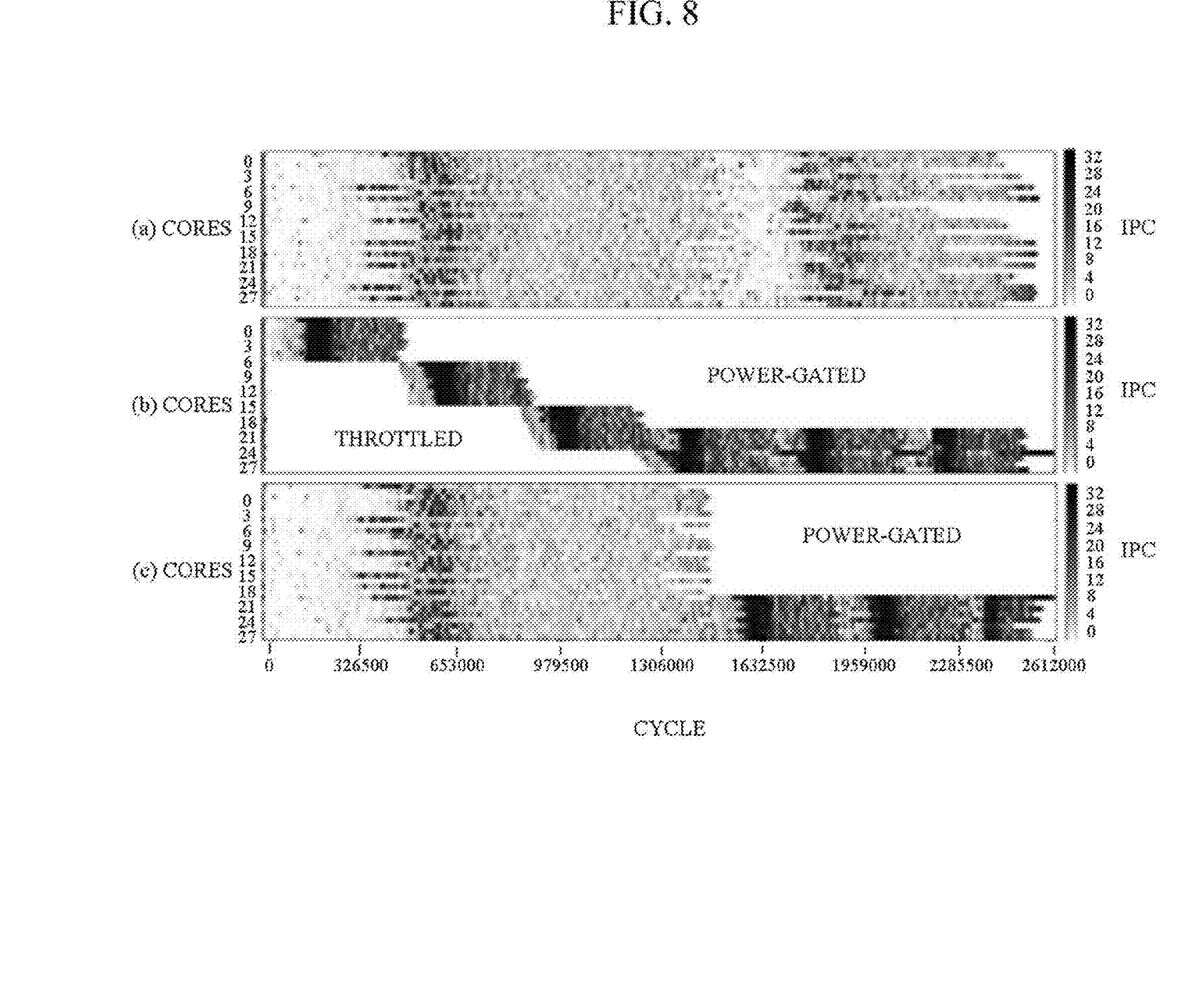
FIG. 8 is a diagram illustrating an example of a result of performance comparison according to an example of a method of job scheduling.

FIG. 8 is a diagram illustrating an example of results of performance comparison according to an example of a method of job scheduling. Portion (a) in FIG. 8 illustrates Instructions Per Cycle (IPC) and performance according to a general GPU method, portion (b) illustrates IPC and performance according to the example of the method of job scheduling, and portion (c) illustrates IPC and performance according to a general power-gating method.

As illustrated in FIG. 8, in the general GPU method of portion (a), entire cores in all cycles continuously operate, thereby consuming dynamic power and static power continuously. Further, in the general power-gating method of portion (c), as entire cores basically continue to operate, all of the cores continuously consume power until power-gating of cores 0-20, which have first completed all jobs, is performed. By contrast, in a multi-core apparatus according to the example of the method of job scheduling as in portion (b), a number of cores that is an optimal number of active-state cores for a least possible energy consumption at every cycle is maintained continuously in an active state to process jobs, and a rest of the cores is maintained in a throttle state or in a power-gating state, such that a least possible energy is consumed at every cycle.

The examples of the multi-core apparatus described may be implemented in a desktop GPU and/or a mobile application processor.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclo-

What is claimed is:

1. A multi-core apparatus, comprising:
cores; and
a job scheduler configured to
determine an optimal number of cores in an active state by throttling one or more of the cores during an operation of an application based on state information received from each of the cores, and
adjust power to maintain the optimal number of cores.

2. The multi-core apparatus of claim 1, wherein each of the cores further comprises:
a front end unit configured to
transmit instructions to an execution unit,
calculate an active cycle count, and store the active cycle count in the active cycle counting unit, in response to the instructions being transmitted to the execution unit, and
calculate a stall cycle count, and store the stall cycle count in the stall cycle counting unit, in response to the instructions not being transmitted to the execution unit.

3. The multi-core apparatus of claim 2, wherein:
each of the cores further comprises a state monitoring unit configured to store the state information; and
the front end unit is further configured to
generate the state information based on the active cycle count and the stall cycle count, and
store the state information in the state monitoring unit.

4. The multi-core apparatus of claim 3, wherein the front end unit 5 is configured to:
generate the state information that indicates to change a respective one of the cores into a throttle state in response to the stall cycle count being greater than the active cycle count and a predetermined threshold.

5. The multi-core apparatus of claim 1, wherein the job scheduler is configured to:
change one or more of the cores into a throttle state based on the state information; and
determine the optimal number of cores based on a result of the change.

6. The multi-core apparatus of claim 5, wherein the job scheduler is configured to:
determine a number of cores in the active state, which remain after the change, as the optimal number of cores, in response to a current cycle being greater than a predetermined cycle.

7. The multi-core apparatus of claim 5, wherein the job scheduler is configured to:
determine a number of cores in the active state as the optimal number of cores, in response to a current cycle being less than or equal to a predetermined cycle, and the number of cores in the active state being equal to a number of memory channels.

8. The multi-core apparatus of claim 1, wherein the job scheduler is configured to:
change a core in the active state and that completely processes jobs, among the cores, into an OFF state, in response to there being a core in a throttle state, among the cores; and
power-gate the core in the OFF state.

9. The multi-core apparatus of claim 8, wherein the job scheduler 5 is configured to:
change the core in the throttle state into the active state in response to the change of the core in the active state into the OFF state, to maintain the optimal number of cores.

10. The multi-core apparatus of claim 1, wherein the job scheduler is configured to:
maintain a core in the active state and that completely processes jobs, among the cores, and assign new jobs to the core in the active state, in response to there not being a core in a throttle state, among the cores.

11. A job scheduling method of a multi-core apparatus, comprising:
changing one or more of cores into a throttle state based on state information received from each of the cores;
determining an optimal number of cores in an active state based on a result of the changing; and
adjusting power to maintain the optimal number of cores based on a result of job processing of cores in the active state.

12. The job scheduling method of claim 11, wherein the changing of the one or more of the cores comprises:
determining whether the state information indicates to change a respective one of the cores into the throttle state; and
changing the respective one of the cores into the throttle state in response to the state information being determined to indicate to change the respective one of the cores into the throttle state.

13. The job scheduling method of claim 11, wherein the state information is generated based on an active cycle count and a stall cycle count of a respective one of the cores.

14. The job scheduling method of claim 11, wherein the determining of the optimal number of cores comprises:
determining whether a current cycle is greater than a predetermined cycle; and
determining a number of cores in the active state as the optimal number of cores in response to the current cycle being determined to be greater than the predetermined cycle.

15. The job scheduling method of claim 14, wherein the determining of the optimal number of cores comprises:
determining whether the number of cores in the active state is equal to a number of memory channels in response to the current cycle being determined to be not greater than the predetermined cycle; and
determining the number of cores in the active state as the optimal number of cores in response to the number of cores in the active state being determined to be equal to the number of memory channels.

16. The job scheduling method of claim 11, wherein the adjusting of power comprises:
changing a core in an active state and that completely processes jobs, among the cores, into an OFF state, in response to there being the one or more of the cores in the throttle state; and
power-gating the core in the OFF state.

17. The job scheduling method of claim 16, wherein the adjusting of power comprises:
changing a core in the throttle state, among the cores, into the active state, in response to the changing of the core in the active state into the OFF state, to maintain the optimal number of cores.

18. The job scheduling method of claim 11, wherein the adjusting of power comprises:
maintaining a core in the active state and that completely processes jobs, among the cores, and assigning new jobs to the core in the active state, in response to there not being the one or more of the cores in the throttle state.

19. An apparatus, comprising:
a processor configured to
change one or more of cores into a throttle state based on state information received from each of the cores, turn off a core in an active state and that completely processes a job, among the cores, in response to the change, and
change a core in the throttle state, among the cores, into the active state, in response to the turning off.

20. The apparatus of claim 19, wherein:
the throttle state is where a respective one of the cores is assigned a job, 5 but is not able to process the job; and
an active state is where a respective one of the cores is assigned a job, and is able to process the job.

21. The apparatus of claim 19, wherein the state information that indicates to change a respective one of the cores into the throttle state is generated in response to a stall cycle count being greater than an active cycle count and a predetermined threshold of the respective one of the cores.

\* \* \* \* \*